United States Patent

[11] 3,624,122

[72] Inventors Marwan R. Kamal;
John R. Nazy; Donald H. Wheeler, all of Minneapolis, Minn.
[21] Appl. No. 560,112
[22] Filed June 24, 1966
[45] Patented Nov. 30, 1971
[73] Assignee General Mills, Inc.

[54] ALICYCLIC DIISOCYANATES
9 Claims, No Drawings
[52] U.S. Cl. .................................................. 260/453 A,
117/124 E, 117/132 B, 117/148, 117/161 R,
260/2.5 AT, 260/75 R, 260/76 NT, 260/77.5 AT,
260/77.5 CH, 260/77.5 NC, 260/404, 260/405.5,
260/453 PH, 260/464, 260/465.9, 260/563 R
[51] Int. Cl. ........................................................ C07c 87/34,
C07c 119/04, C08c 22/24
[50] Field of Search ........................................... 260/453 A

[56] References Cited
UNITED STATES PATENTS
2,319,057 5/1943 Hanford ........................ 260/453
3,326,501 8/1943 Siefken et al. ................ 260/453
2,865,940 12/1958 Nobis et al. ................... 260/453

OTHER REFERENCES
Siefken: Annalen der Chemie, Vol. 562, page 124 (1949).
Siefken: Chemical Abstracts, Vol. 44, pages 109– 119 (1950).

Primary Examiner—Charles B. Parker
Assistant Examiner—Dolph H. Torrence
Attorneys—Anthony A. Juettner, William C. Babcock and Gene O. Enockson ABSTRACT: Diisocyanates of the formula
$R'-Z-R''-CH_2NCO$
where $R'$ is a monovalent straight chain saturated or ethylenically unsaturated aliphatic hydrocarbon radical containing 2 to 6 carbon atoms, $R''$ is a divalent straight chain saturated or ethylenically unsaturated hydrocarbon radical containing 7 to 11 carbon atoms, the sum of the carbon atoms in $R'$ and $R''$ is 13, and Z is a divalent radical of the structure

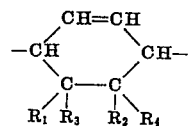

or

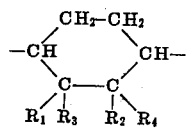

where $R_1$ and $R_2$ are H or $CH_3$ with the proviso that one of such radicals must be H and $R_3$ and $R_4$ are H or $CH_2NCO$ with the proviso that one of such radicals must be H and the other must be $CH_2NCO$. Polymers prepared by reacting such diisocyanates with compounds having at least two active hydrogen atoms as determined by the Zerewitinoff method.

ALICYCLIC DIISOCYANATES

The present invention relates to novel diisocyanates and, more particularly, to new diisocyanates derived from certain diamines ultimately prepared from conjugated fatty acid compounds and dienophiles. It also relates to polymers prepared from the new diisocyanates and compounds having at least two active hydrogen atoms.

We have now discovered a new class of diisocyanates having the idealized, general structural formula:

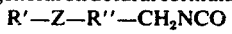

where R' is a monovalent straight chain aliphatic hydrocarbon radical containing 2 to 6 carbon atoms, R'' is a divalent straight chain aliphatic hydrocarbon radical containing 7 to 11 carbon atoms, the sum of the carbon atoms in R' and R'' is 13, and Z is a divalent radical of the structure

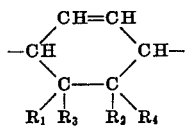

or

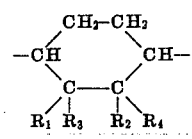

where $R_1$ and $R_2$ are H or $CH_3$ with the proviso that one of such radicals must be H and $R_3$ and $R_4$ are H or $CH_2NCO$ with the proviso that one of such radicals must be H and the other must be $CH_2NCO$.

Our new diisocyanates are preferably prepared by the reaction of certain diamines with an excess of phosgene in an inert solvent. The diamines employed have the idealized, general structural formula:

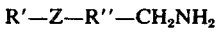

where R', R'', Z, $R_1$ and $R_2$ have the meanings set forth above and $R_3$ and $R_4$ are H or $CH_2NH_2$ with the proviso that one of such radicals must be H and the other must be $CH_2NH_2$. These diamines are in turn prepared by the hydrogenation of dinitriles of the idealized, general structural formula:

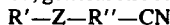

where R', R'', Z, $R_1$ and $R_2$ have the meanings set forth above and $R_3$ and $R_4$ of the radicals Z are H or CN with the proviso that one of such radicals must be H and the other must be CN. The diamines are prepared from the described dinitriles by catalytic or chemical reduction of the dinitriles. Catalytic reduction is preferably accomplished by hydrogenation of the dinitrile over nickel or cobalt catalysts although certain noble metal catalysts such as palladium can also be used. The chemical reduction of the dinitriles can be accomplished using reducing agents such as lithium aluminum hydride.

The starting dinitriles are prepared in various ways. One preferred method is to first prepare an adduct of an acrylonitrile and a lower alkyl ester of a conjugated fatty acid and then convert the resulting adduct to the dinitrile by reaction with ammonia. Another preferred method is to add an acrylonitrile to a conjugated fatty acid nitrile.

A variety of conjugated fatty acids and derivatives and dienophiles can be used in the preparation of the starting dinitriles. Representative of the dienophiles are acrylonitrile, methacrylonitrile, acrylic acid, methacrylic acid, crotonic acid, the $C_1$ to $C_8$ alkyl esters of such acids, propiolactone and the like. The conjugated fatty acids used in the preparation of the dinitriles are those having two or more ethylenic bonds in the hydrocarbon chain, at least two of such ethylenic bonds being in conjugal relationship. Fatty acids containing 18 carbon atoms and two or more ethylenic bonds are commonly found in or derived from semidrying and drying oils such as soy bean oil, tall oil, tung oil, linseed oil and the like. Specific illustrative 18 carbon atom acids are 9,12-octadecadienoic acid, 9,11-octadecadienoic acid, 10,12-octadecadienoic acid, 9,12,15-octadecatrienoic acid (linolenic acid), 6,9,12-octadecatrienoic acid, 9,11,13-octadecatrienoic acid (eleostearic acid), 10,12,14-octadecatrienoic acid (pseudoeleostearic acid) and the like. Derivatives of the described fatty acids can also be used in the preparation of the dinitriles. Thus esters, such as the $C_1$ to $C_8$ alkyl esters, amides, nitriles, soaps and the like can be used. Where the fatty acid or derivative is unconjugated, conjugation of the double bonds can be effected by conventional techniques. Thus, for example, the acids and esters can be conjugated using well-known alkali conjugation techniques. Also, the nitriles can be conjugated using isomerization catalysts such as alkali metal alkoxides. Similar known techniques can be used for the amides and the like.

As indicated above, our new diisocyanates are preferably prepared from the described diamines by reaction with excess phosgene in an inert solvent. Suitable illustrative inert solvents are toluene, xylene, chlorobenzene, o-dichlorobenzene and the like. The diamine is preferably added slowly to a solution of phosgene in the inert solvent. The temperature of the resulting reaction mixture is then raised to complete the reaction and distill off the excess phosgene, solvent and HCl formed by the reaction. The preparation of the new diisocyanates of our invention is further illustrated by the following examples. Said examples are to be considered as illustrative of certain preferred embodiments of the invention and are not to be considered as limiting.

EXAMPLE

A. Dinitrile Preparation

In a 2,000 ml. flask fitted with thermowell, reflux condenser and addition funnel was placed 1,084 g. conjugated tall oil acid nitrile (containing 34 percent by weight or 1.46 mole conjugated linoleonitrile). 100 ml. (1.5 mole) acrylonitrile (containing 0.2 percent by weight p-methoxy phenol) and 0.5 g. iodine were added to the nitrile and then the reaction mixture was heated to reflux. The initial reaction temperature was 133° C. and the mixture was refluxed for 50 hours during which time another 100 ml. (1.5 mole) acrylonitrile and 10.5 g. iodine were added. The reaction temperature varied during the 50-hour reaction period from 110° C. to 142° C. Small samples were withdrawn during the reaction period to observe the progress of conjugation disappearance by infrared spectral analysis. After the reaction period was completed, the product was stripped under vacuum at 90° C. to remove unreacted acrylonitrile. The residue was then distilled through a spinning band column to give 251 g. of dinitrile which boiled at 219° C./56 mm. Hg. and 212° C./0.45 mm. Hg. (55 percent yield based on starting conjugated linoleonitrile taking into account the small analytical samples withdrawn). The dinitrile had the following properties:

| | |
|---|---|
| Nitrogen content (Kjeldahl) | 8.68% |
| Iodine number | 89.4 |
| Refractive index n25D | 1.4805 |

The calculated nitrogen content and iodine number for the dinitrile having the empirical formula $C_{21}H_{34}N_2$ are 8.91 percent and 80.7, respectively.

B. Diamine Preparation

In a 1-liter Magne-Dash autoclave was placed 230 g. of dinitrile prepared as in A above. To the dinitrile was added 196 g. anhydrous methanol and 46 g. No. 28 Raney nickel catalyst which had been washed three times with anhydrous methanol. The autocalve was sealed, purged with nitrogen and charged with 150 ml. (98 g.) liquid ammonia and hydrogen gas to bring the pressure to 1,750 p.s.i. The mixture was heated at 108° C.±4° C. for 2¼ hours with hydrogen addition to maintain the pressure at 1,750 p.s.i. The autoclave was cooled and discharged and the resulting solution filtered and stripped of ammonia and solvent. The crude product was distilled through a spinning band column giving 198 g. (84 percent yield) of diamine having the following properties:

| | |
|---|---|
| Boiling point | 202–8° C./1 mm. Hg. |
| Refractive index n25D | 1.4861 |

| | |
|---|---|
| Amine number | 334.6 |
| Secondary and tertiary amine number | 0.26 |
| Nitrogen content (Kjeldahl) | 8.57% |
| Iodine number | 72.2 |

The calculated amine number and nitrogen content of the diamine of the empirical formula $C_{21}H_{42}N_2$ are 347.8 and 8.68 percent, respectively. The diamine was thus 96.3 percent pure.

C. Diisocyanate Preparation

In a 2-liter, three-necked flask equipped with an ice water cooled condenser, a stirrer and an addition funnel and submerged in an ice-salt bath were dissolved 450 g. (4.5 mole) phosgene in 800 ml. dry toluene at −2° C. The ice-salt bath was removed and the temperature of the solution was allowed to rise to 17° C. To this solution was then added slowly a solution of 166 g. (1.0 equivalent) of a diamine as prepared in B above in 150 ml. dry toluene. The addition took 20 minutes during which time the temperature of the reaction mixture rose to 37° C. A heating mantle was placed under the reaction flask and the reaction mixture was then heated slowly until the temperature of the mixture reached 77° C. (2-hours' heating). At this point the ice water condenser was replaced by a tap water condenser and the temperature of the reaction mixture was allowed to rise to 110° C. A distillation head was then connected to the reaction flask and 500 ml. toluene were distilled off. Upon cooling, a viscous insoluble residue separated. The supernatant liquid was decanted and remaining solvent was removed therefrom under reduced pressure at 60° C. There was obtained 170 g. of an amber liquid. 150 g. of this liquid was distilled through a spinning band column to give 105.6 g. of a main cut of diisocyanate having a boiling point of 211°–214° C./0.3 mm. Hg. The diisocyanate had the following properties:

| | |
|---|---|
| % —NCO | 21.34 |
| Refractive index n25D | 1.4830 |
| Refractive index n30D | 1.4815 |

The diisocyanate consisted essentially of a mixture of unisolated isomers of the structural formulas:

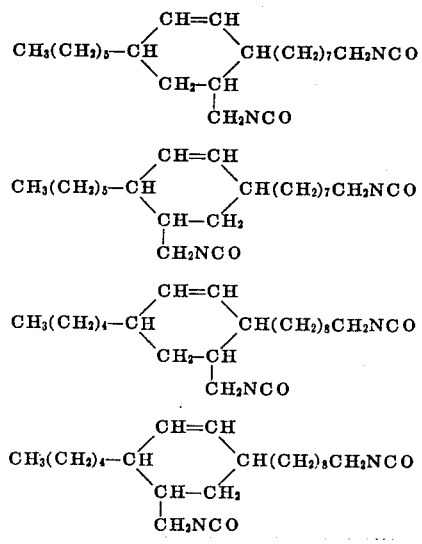

EXAMPLE II

A. Dinitrile Preparation 379 g. of distilled methyl esters of tung oil acids (containing 88 percent by weight or 1.12 mole methyl α-eleostearate) and 214 g. (4.04 mole) acrylonitrile (containing 0.2 percent by weight p-methoxy phenol) were charged into a 1-liter Magne-Dash autoclave. After sealing the autoclave, the pressure was raised to 1,500 p.s.i. by the addition of nitrogen gas. The reaction mixture was heated to an initial temperature of 153° C. and held at 150°–161° C. for 4 hours. It was then allowed to cool to a temperature of 25° C. over a period of 1½ hours at which point the pressure was gradually released. The product was filtered and then vacuum pump stripped at 90° C. There was obtained 425.5 g. of a clear yellow liquid which was then distilled through a spinning band column to give 283 grams of the monoadduct of acrylonitrile and methyl α-eleostearate (77 percent yield based on the conjugated methyl α-eleostearate).

A mixture of 268.5 g. (0.78 mole) of the monoadduct and 1.34 g. zinc oxide were charged into a 500 ml. round bottom flask equipped with a stirrer, thermometer, ammonia addition tube and gas trap. The mixture was heated at 275° C. as 251 g. ammonia was slowly bubbled through said mixture over a 24-hour period. The progress of the reaction was followed by subjecting small samples of the reaction mixture to infrared spectral analysis. At the end of the 24-hour reaction period, the reaction mixture was distilled through a spinning band column to give 78 g. of dinitrile boiling at 197°–205° C./0.35 mm. Hg. (33 percent yield taking into account the seven analytical samples totaling 38.2 g. withdrawn during the reaction period). The dinitrile had the following properties:

| | |
|---|---|
| Nitrogen content (Kjeldahl) | 8.70% |
| Refractive index n25D | 1.4931 |

The calculated nitrogen content of the dinitrile having the empirical formula $C_{21}H_{32}N_2$ is 8.97 percent.

B. Diamine Preparation

In a 1-liter Magne-Dash autoclave were placed 111 g. (0.36 mole) of dinitrile prepared as in A above. To the dinitrile were added 300 ml. benzene and 33 g. of No. 28 Raney nickel catalyst which had been washed twice with anhydrous methanol and then twice with benzene. The autoclave was sealed, purged with nitrogen and charged with 110 ml. (71 g.) liquid ammonia and hydrogen gas to bring the pressure to 1,500 p.s.i. The mixture was heated at 120° C.±10° C. for 1¾ hours with hydrogen addition to maintain the total pressure above 1,300 p.s.i. The autoclave was cooled and discharged and the resulting solution filtered and stripped of ammonia and solvent to give 112 g. of crude product. A 105 g. portion of the crude product was distilled through a spinning band column giving 89.5 g. (84 percent yield) of diamine having the following properties:

| | |
|---|---|
| Boiling point | 155°–179° C./0.3 mm. Hg |
| Refractive index n25D | 1.4956 |
| Amine number | 341 |
| Secondary and tertiary amine number | 0.26 |
| Nitrogen content (Kjeldahl) | 8.45% |

The calculated amine number and nitrogen content of the diamine having the empirical formula $C_{21}H_{40}N_2$ are 350 and 8.74 percent, respectively. The diamine was thus 97 percent pure.

C. Diisocyanate Preparation

A diamine as prepared IN B above is reacted with phosgene as in example I.C. to yield a diisocyanate consisting essentially of a mixture of unisolated isomers of the structural formulas:

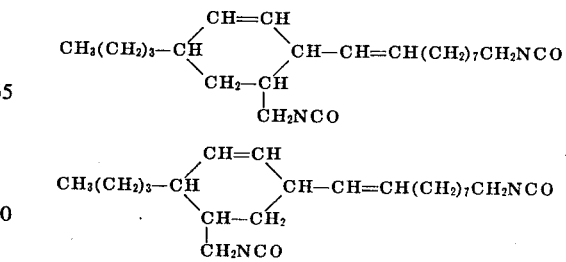

EXAMPLE III

A. Dinitrile Preparation 532 g. of the monoadduct of acrylonitrile and methyl α-eleostearate prepared similarly as in example II.A. above and 26.6 g. palladium catalyst (10 percent on carbon) were charged into a Magne-Dash autoclave. The autoclave was sealed and the pressure raised to 1,000 p.s.i. by addition of hydrogen gas. The temperature was raised from an initial 26° C. to 130° C. over a period of 25 minutes and then held at 114°–132° C. over a period of 2½ hours with addition of hydrogen to maintain the pressure at about 1,000 p.s.i. The product was then cooled to 38° C. over a 50-minute period and the pressure was gradually released. The product was washed out with chloroform, filtered twice and then the chloroform was stripped therefrom using a rotary evaporator up to 60°–65° C. under a vacuum of 1.7 mm. Hg. There was obtained 519 grams of product which was distilled through a spinning band column to yield 388 g. of saturated monoadduct of acrylonitrile and methyl α-eleostearate.

Three hundred three grams of the saturated adduct (0.867 mole) and 1.515 g. zinc oxide were placed in a 1-liter three-neck flask equipped with a stirrer and an inlet and outlet for ammonia with a cold water trap. The mixture was heated at 275° C. as 223 grams ammonia was bubbled therethrough over a period of 16 hours. The progress of the reaction was followed by subjecting small samples of the reaction mixture to infrared spectral analysis. At the end of the 16-hour reaction period, the reaction mixture was distilled through a spinning band column to give 217 g. of dinitrile having the following properties:

| | |
|---|---|
| Nitrogen content (Kjeldahl) | 8.85% |
| Iodine value | 5.2 |
| Refractive index n25D | 1.1470 |

B. Diamine Preparation

Example II.B. was repeated using 205 g. of dinitrile prepared as in A above, 200 ml. anhydrous methanol, 30.8 g. No. 27 Raney cobalt catalyst which had been washed three times with anhydrous methanol, and 150 ml. (98 g.) liquid ammonia. The hydrogenation was carried out at 140°±3° C. for 1½ hours under hydrogen at a total pressure of 1,700 p.s.i. The crude product was distilled as in example II.B. giving 196 g. (93 percent yield) of diamine having the following properties:

| | |
|---|---|
| Boiling point | 175° C./0.4 mm. Hg |
| Refractive index n25D | 1.4812 |
| Amine number | 342.4 |
| Secondary and tertiary amine number | 0.44 |
| Nitrogen content (Kjeldahl) | 8.5 percent |
| Iodine number | 7.4 |

The calculated amine number and nitrogen content of the diamine of the empirical formula $C_{21}H_{44}N_2$ are 345.7 and 8.63 percent, respectively. Thus the diamine is 96 percent pure as determined by amine number.

C. Diisocyanate Preparation

A diamine prepared as in B above is reacted with phosgene as in example I.C. to yield a diisocyanate consisting essentially of a mixture of unisolated isomers of the structural formulas:

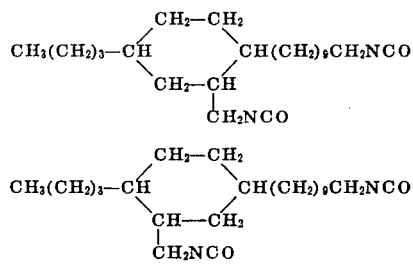

EXAMPLE IV

A. Dinitrile Preparation

Into a 1,000 ml. thermowell flask were charged 1.70 mole of the methyl ester of alkali conjugated linoleic acid (93 percent conjugated), 89 g. (1.68 mole) acrylonitrile (containing 0.2 percent by weight p-methoxy phenol) and 2.08 g. iodine. The mixture was heated at reflux for 37 hours during which time the pot temperature increased from 100° C. to 150° C. indicating that the reaction was 78 percent complete. The product was then heated under vacuum to remove unreacted acrylonitrile and distilled through a spinning band column to give a 65.5 percent yield of the monoadduct of acrylonitrile and the methyl ester of conjugated linoleic acid.

332 g. of the monoadduct as above prepared and 1.66 g. zinc oxide were placed in a 1-liter three-neck flask equipped with a stirrer and an inlet and outlet for ammonia with a cold water trap. The mixture was heated at 275° C. as 270 g. ammonia was bubbled therethrough over a period of 18–19 hours. At the end of the reaction period, the reaction mixture was distilled through a spinning band column to give 224 g. dinitrile having the following properties:

| | |
|---|---|
| Nitrogen content (kjeldahl) | 8.93% |
| Refractive index n25D | 1.4797 |
| Iodine number | 79.0 |

B. Diamine Preparation

Example II.B. was repeated using 206 g. (0.66 mole) of dinitrile was prepared in A above, 200 ml. anhydrous methanol, 31.5 g. No. 27 Raney cobalt catalyst which had been washed three times with anhydrous methanol, and 150 ml. (98 g.) liquid ammonia. The hydrogenation was carried out at 140° C.±2° C. for 2¼ hours under hydrogen at a total pressure of 1,600 p.s.i. The crude product was distilled as in example II.B. to give 189.5 g. (90 percent yield) of diamine having the following properties:

| | |
|---|---|
| Boiling point | 166°–174° C./0.2 mm. Hg |
| Refractive index $n^{25}D$ | 1.4859 |
| Amine number | 348.5 |
| Secondary and tertiary amine number | <8.58 percent |
| Nitrogen content (kjeldahl) | 8.58% |
| Iodine number | 60.0 |

The calculated amine number and nitrogen content of the diamine of the empirical formula $C_{21}H_{42}N_2$ are 347.8 and 8.68 percent, respectively.

C. Diisocyanate Preparation

A diamine as prepared in B above is reacted with phosgene as in example I.C. to yield a diisocyanate consisting essentially of a mixture of unisolated isomers of the same structural formulas as the diisocyanate of example I.C.

The new diisocyanates of our invention have a high boiling point and low vapor pressure at ambient conditions. They are light colored and do not show any evidence of discoloration upon storage. In addition they are characterized by low toxicity. In this respect, a diisocyanate as prepared in example III.C. above had an acute oral toxicity value, $LD_{50}$, of 34.6 or greater.

Our new diisocyanates are particularly valuable for the preparation of polymers by reaction with compounds bearing at least two active hydrogen atoms as determined by the Zerewitinoff method. The Zerewitinoff test is described by Kohler in J. Am. Chem. Soc., 49, 3181 (1927). Such polymers are useful as coatings for a variety of substrates and for other purposes including the preparation of moldings.

In general, the active hydrogen atoms of compounds reactive with our new diisocyanates are attached to carbon, oxygen, nitrogen or sulfur atoms. Compounds containing the following groups will have active hydrogen atoms: acetamido, primary amino, secondary amino, amido, carbamyl, carboxyl, diazoamino, . hydrazo, hydrazono, hydroxamino, hydroxyl imido, imino, isonitro, isonitroso, mercapto, nitroamino, xamyl, sulfamino, sulfamyl, sulfin, sulfo, thiocarbamyl, triazino, ureido, ureylene, and urethaneo. Most often these active hydrogen atoms are attached to oxygen, nitrogen, or sulfur atoms; thus they will be a part of groups such as —OH, —SH, —NH—, —NH$_2$, —CO$_2$H, —CONH$_2$, —CONHR where R represents an organic radical, —SO$_2$OH, —SO$_2$NH$_2$, —CSNH$_2$. Examples of suitable types of compounds include water, hydrogen sulfide, ammonia, hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thios having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the present invention such as, for example, amino alcohols which contain an amino group and a hydroxyl group, amino alcohols which contain two amino groups and one hydroxyl group, aminoacids and the like. Further illustrative classes and specific organic compounds containing active hydrogen atoms useful for preparing polymers according to our invention are described immediately hereinbelow.

Any suitable polyester may be used and may contain terminal hydroxyl groups, terminal carboxylic acid groups, amino groups or the like. Moreover, the polyester may be a polyester amide which was prepared by condensing an amino alcohol containing both free amino groups and free hydroxyl groups with the other components used in the preparation of polyesters. The polyester may be prepared by reacting a polycarboxylic acid or hydroxy carboxylic acid with polyhydric alcohols. It is also possible to use a mixture of polyhydric alcohols and polyamines such as ethylenediamine, polyethylenediamine, 1,4-butylenediamine and the like. Amines such as diethyl ether diamine or amino carboxylic acids such as glycine, alanine, valine, phenylalanine, hydroxylproline and the like may also be used. The polyesters may contain hetero atoms in addition to the ester groups including oxygen, sulfur, nitrogen and the like in the chain. Moreover, the radicals making up the polyester may be either saturated or unsaturated and may contain double or triple bonds as well as modifying radicals of saturated or unsaturated fatty acids such as oleic acid or fatty alcohols such as oleyl alcohol and the like.

Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerine, trimethyl olpropane, 1,3,6-hexanetriol, triethanolamine, pentaerythritol, sorbitol and the like.

Any suitably polyhydric polyalkylene ether may be used as the active hydrogen containing compound such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide, and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example styrene oxide and the like. The polyhydric polyalkylene ethers may have either primary or secondary hydroxyl groups and preferably are polyhydric polyalkylene ethers prepared from alkylene oxides having from 2 to 5 carbon atoms such as, for example, polyethylene ether glycols, polypropylene ether glycols, polybutylene ether glycols and the like. It is often advantageous to employ some trihydric or higher polyhydric alcohols such as glycerine, trimethylol propane, pentaerythritol and the like in the preparation of the polyhydric polyalkylene ethers so that some branching exists in the product. Generally speaking, it is advantageous to condense from about 5 to about 30 moles of alkylene oxide per functional group of the trihydric or higher polyhydric alcohol. The polyhydric polyalkylene ethers may be prepared by any known process such as, for example, the process disclosed in 1859 by Wurtz and in Encyclopedia of Chemical Technology, Volume 7, pages 257 to 262, published by Interscience Publishers, Inc. (1951), or in U.S. Pat. No. 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Pat. Nos. 2,862,972, and 2,900,368.

Any suitable polyhydric alcohol may be used as the active hydrogen-containing compound such as, for example, alkane diols such as, for example, ethylene glycol, 1,3-propylene glycol, 1,2-propylene glycol, 1,4-butylene glycol, 1,3-butylene glycol, 1,5-pentanediol, 1,4-butanediol, 1,3-pentanediol, 1,6-hexanediol, 1,7-heptanediol, 2,2-dimethyl-1,3-propanediol, 1,8-octanediol and the like including 1,20-eicosanediol and the like; alkene diols such as, for example, 2-butene-1,4-diol, 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as 4-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as for example, 2-butene-1,4-dithiol and the like; alkyne thiols such as, for example, 3-hexyne-1,6-dithiol and the like.

Any suitable polyamine may be used including, for example, aromatic polyamines such as, for example, p-amino aniline, 1,5-diamino naphthalene, 2,4-diaminotoluene, 1,3,5-benzene triamine, 1,2,3-benzene triamine, 1,4,5,8-naphthalene tetramine and the like; aliphatic polyamines such as, for example, ethylenediamine, 1,3-propylenediamine, 1,4-butylenediamine, 1,3-butylenediamine, diethylenetriamine, triethylenetetramine, 1,3,6-hexane triamine, 1,3,5,7-heptane tetramine and the like; heterocyclic polyamines such as, for example, 2,6-diamino pyridine, 2,4-diamino-5-aminomethyl pyrimidine, 2,5-diamino-1,3,4-thiadiazole, piperazine and the like.

One especially preferred group of amines useful for preparing polymers according to our invention are polyamines having the primary amine groups thereof blocked by ketimine or aldimine groups. The reaction of carbonyl compounds with the primary amine groups can be illustrated as follows:

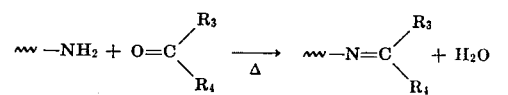

The useful carbonyl compounds may have the following theoretical structural formula:

where $R^3$ and $R^4$ are organic radicals, are each substantially inert to the ketimine or aldimine formation reaction and are preferably hydrogen or short-chain alkyl groups (1 to 4 carbon atoms). Preferred compounds are low molecular weight ($C_2$—$C_6$) aldehydes or ketones that are volatile so that an unreacted excess thereof may easily be removed by conventional distillation practices when the reaction is completed. Such volatile compounds are also preferred so that when the blocked polyamine is mixed with the new diisocyanate and exposed to moisture, the freed aldehyde or ketone can be easily removed from the reaction mixture. Examples of preferred carbonyl compounds include such aldehydes and ketones as acetone, methylethyl ketone, methyl-n-butyl ketone, methyl-tert-butyl ketone, ethylisopropyl ketone, acetaldehyde, propionaldehyde, butyraldehyde, isobutyraldehyde, and the like (i.e. including hexanone and hexanal). The polyamines to be blocked preferably have the structure

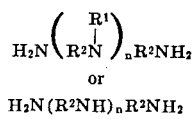

where $R^2$ is a difunctional aliphatic group containing from 2-48 carbon atoms, $R^1$ is an aliphatic group containing 1-24 carbon atoms and *n is an integer of from* 0-20. Representative $R^1$ radicals are methyl, propyl, butyl, decyl, hexadecyl, hexenyl, octenyl, tridecenyl, octadecyl, undecynyl and the like. Inert or noninterfering groups such as Cl, nitro and the like may be present on $R^1$ and/or $R^2$.

Any suitable reaction product of a phenol with an alkylene oxide yielding a compound containing active hydrogens may be used such as, for example, those disclosed in U.S. Pat. No. 2,843,568, such as for example, the reaction product of hydroquinone with ethylene oxide to give a polyalkylene arylene ether glycol having a molecular weight above about 750 or other polyalkylene arylene ether glycols disclosed in said patent.

Any suitable reaction product of a phenol-aldehyde resin with an alkylene oxide may be used such as, for example, a novolak having the formula

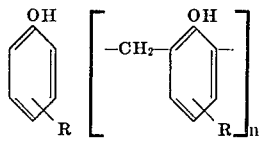

wherein *n* is 1 to 5 and R is a lower alkyl radical such as methyl, ethyl, propyl, butyl, tertiary butyl and the like reacted with an alkylene oxide such as those disclosed above for the preparation of the polyhydric polyalkylene ethers.

Any suitable reaction product of an amine with an alkylene oxide may be used such as, for example, the reaction product of an alkylene oxide with a tolylenediamine such as, 2,4-tolylenediamine, 2,6-tolylenediamine or the like, a diphenylmethane diamine such as 4,4'-diaminodiphenylmethane or the like, xylylene diamine, as well as alkylene diamines such as, for example, ethylenediamine, propylenediamine, 1,4-butylenediamine, hexamethylenediamine and the like including 1,10-dodecane diamine.

Any suitable phenol may be used such as, for example, 2,2-bis(p-hydroxyphenyl)propane (Bisphenol A) and the like.

Any suitable polyamide may be used such as, for example, those obtained by reacting adipic acid with hexamethylenediamine and the like.

Any suitable polyacetal may be used such as, for example, the reaction product of formaldehyde or other suitable aldehydes with a polyhydric alcohol such as those disclosed above for use in the preparation of the hydroxyl polyester.

Other alcohol compounds which do not necessarily fit within any of the previously set forth classes of compounds and which nevertheless contain active hydrogen containing groups which are quite suitable for the production of the polymers of the present invention are pentaerythritol, sorbitol, triethanolamine, mannitol, N,N,N',N'-tetrakis(2-hydroxypropyl)ethylenediamine, as well as compounds of any of the classes set forth above which are substituted with halogen such as, for example, chloro, iodo, bromo and the like; nitro; alkoxy, such as, for example, methoxy, ethoxy, propoxy, butoxy, and the like; carboalkoxy such as for example, carbomethoxy, carbethoxy and the like; dialkyl amino such as, for example, dimethylamino, diethylamino, dipropylamino, methylethylamino and the like; mercapto, carbonyl, thiocarbonyl, phosphato and the like.

Other substances which can be used include natural substances such as castor oil and the like.

The molar proportions of the diisocyanate of our invention and the compounds bearing Zerewitinoff active hydrogen atoms can vary widely. Those skilled in the art can determine the proportions of reactants best suited for a particular purpose. For example, when making polyurethane elastomers, one often uses approximately equimolar amounts of glycol and the new diisocyanate. Preferably, the active hydrogen containing compound will be used in a molar ratio to the new diisocyanate of 1:10 to 10:1.

The polymers of our invention can be prepared by reacting the new diisocyanate and the active hydrogen containing compound at subatmospheric, atmospheric or superatmospheric pressure. Atmospheric pressure is preferred. The reaction can be operated over a wide range of temperatures. Those skilled in the art will recognize that there are great differences in the relative reactivity of various groups containing active hydrogen atoms, amines reacting faster than alcohols, primary alcohols reacting faster than tertiary alcohols—to name a few examples; accordingly, one will select a temperature at which the reaction occurs at a rate convenient for the purpose at hand. Preferably, the reaction temperature ranges between about 20° C. and 150° C. However, the temperature is not critical.

If desired, the reaction may be carried out in an inert solvent. Representative solvents include tetrahydrofuran, o-dichlorobenzene, chlorobenzene, xylene, methyl isobutyl ketone, toluene and ethyl acetate. In general, the solvent should be free from isocyanate-reactable groups such as groups bearing Zerewitinoff-active hydrogen atoms.

Any catalyst which is capable of catalyzing the reaction between an active hydrogen containing compound and an isocyanate can be used in the preparation of the polymers of our invention. This includes all of the heretofore known catalysts for urethane reactions which are preferable basic organic accelerators such as, tertiary amines or nonbasic metallic compounds such as those disclosed in U.S. Pat. No. 2,846,408 and the compounds for the catalysis of the isocyanate-hydroxyl reaction disclosed in the "Journal of Applied Polymer Science," Volume IV, Issue No. 11, pages 207 to 211 (1960). It is not possible to mention here each and every catalyst which is contemplated by the invention because to do so would take up too much space. It is only possible to mention some of the more important examples. The tertiary amines may be used such as hexahydrodimethyl aniline, triethyl amine, N-ethylmorpholine, N-methyl-N'-dimethyl-aminoethyl piperazine, triethylenediamine, permethylated diethylenetriamine, bis(aminoethyl) adipate, N-methyl morpholine, dimethyl cetyl amine, N,N,N', N'-tetramethyl- 1,3-butylenediamine, diethylethanolamine, N-cocomorpholine, 3-ethyl-N-dimethylpropylamine, N-dimethyl-N-methyl-isopropyl propylenediamine, N-dimethyl aminopropyl acetamide, N,N-diethyl-3-(dimethylamino)propyl amine, dimethylbenzylamine, hydramethyl morphine, dimethyl propylamine, N,N-diethyl hydroxyethylammonium benzoate, N,N-diethylaminoethylbenzene and the like.

Any suitable metal catalyst may be used such as, for example, bismuth nitrate, lead 2-ethylhexoate, lead benzoate, lead oleate, butyl tin trichloride, stannic chloride, tributyltin cyanate, stannous octoate, stannous oleate, dibutyltin di(2-ethylhexoate), dibenzyltin di(2-ethylhexoate), dibutyltin dilaurate, dibutyltin diisooctylmaleate, dibutyltin sulfide, dibutyltin dibutoxide, dibutyltin bis-(o-phenylphenate), dibutyltin bis(acetylacetonate), di(2-ethylhexyl)tin oxide, titanium tetrachloride, dibutylititanium dichloride, tetrabutyl titanate, butoxytitanium trichloride, ferric chloride, ferric 2-ethyl-hexoate, ferric acetylacetonate, antimony trichloride, antimony pentachloride, triphenylantimony dichloride, uranyl nitrate, cadmium nitrate, cadmium diethyldithiophosphate, cobalt benzoate, cobalt 2-ethyl hexoate, thorium nitrate, triphenylaluminum, trioctylaluminum, aluminum oleate, diphenylmercury, zinc 2-hexoate, zinc naphthenate, nickel naphthenate, molybdenum hexacarbonyl, cerium nitrate, vanadium trichloride, cupric 2-ethyl hexoate, cupric acetate, manganese 2-ethyl hexoate, manganese linoresinate, zirconium 2-ethyl hexoate and zirconium naphthenate and the like. The preferred catalysts are the tertiary amines and the organotin compounds, especially triethylenediamine, stannous octoate, stannous oleate, dibutyltin dilaurate, dibutyltin di(2-ethyl hexoate) and the like.

In the preparation of polymers according to our invention, a portion of the new diisocyanates (i.e., up to about 90 mole percent and preferably from 0 to 50 mole percent) can be replaced by known polyisocyanates. Representative of such known polyisocyanates are ethylenediisocyanate, hexamethylenediisocyanate, butylene-1,3-diisocyanate, ethylidene diisocyanate, butylidene diisocyanate, 1,2,4-butanetriisocyanate, 1,3,3-pentanetriisocyanate, p-phenylene-2,2'-bis(ethylisocyanate), 1,4-naphthalene-2,2'-bis(ethylisocyanate), 5-chloro phenylene-1,3-bis(propyl-3-isocyanate), tolylene diisocyanate, m-phenylene diisocyanate, p-phenylene diisocyanate, diphenylene-4,4'-diisocyanate, xylylene-1,4-diisocyanate, 4,4'-diphenylenemethanediisocyanate and the like. A particularly desireable group of polyisocyanates to be employed in combination with our new diisocyanates in the preparation of the polymers of the invention are those described in the application of Rogier and Kamal, Ser. No. 250,211, filed Jan. 9, 1963, entitled "Polyisocyanates and Derivatives." These polyisocyanates are derived from polymeric fat acids and have the following idealized structural formula:

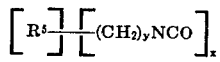

where $y$ is 0 or 1, $x$ is an integer of 2 to about 4 and $R^5$ is the hydrocarbon group of polymeric fat acids. Preferably, $x$ is 2. The polyisocyanates of the above formula wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. The said polyisocyanates are further described in the noted Rogier and Kamal application which disclosure is incorporated herein by reference.

The following examples illustrate the preparation of polymers of the present invention. The said examples are not to be considered as limiting.

EXAMPLE V

A mixture of 19.8 g. diisocyanate as prepared in example IV.C. and 8.9 g. of ketimine blocked polyamine prepared from 1 mole diethylenetriamine and 2 moles methyl isobutyl ketone was applied as a 3-mil coating on glass, tin plate, black plate steel, polished cold-rolled steel, granodized steel, copper and redwood panels. The coated substrates were then exposed to an atmosphere containing 30 percent relative humidity (ambient room temperature). The polymer was thus formed in situ on the various substrates and the coatings became tack free after 90 minutes. The coating on glass after 14 days had a Pencil hardness of 4B and a Sward Rocker hardness of 37. The coating on tin plate had a G.E. extensibility of >60 percent. The gloss retention of the coating on the redwood panels was good after 500 hours in a carbon arc Weather-Ometer. Adhesion of the coatings to tin plate, black plate steel, polished cold-rolled steel, granodized steel and copper was excellent while there was a 73 percent loss of the coating from glass after 14 days. Adhesion was measured by the 100-square cross hatch cellophane tape adhesion test. No squares were pulled from the surface of any substrate except the glass.

EXAMPLE VI

Example V was repeated except the ketimine blocked polyamine used therein was replaced with a ketimine blocked polyamine prepared from 1 mole bis(aminopropyl) amine and 2 moles methyl isobutyl ketone. The coating on glass after 14 days had a Pencil hardness of <6B and a Sward Rocker hardness of 20. The coating on tin plate had a G.E. extensibility of >60 percent. The gloss retention on redwood panels was good after 500 hours in a carbon arc Weather-Ometer. Adhesion, measured as in example V, was excellent on black plate steel, polished cold-rolled steel, granodized steel and copper as evidenced by no loss of squares of the coating. Glass showed a coating square loss of only 3 percent and tin plate a loss of 48 percent after the 14-day period.

EXAMPLE VII

Example V was repeated using a mixture of 2.0 g. diisocyanate as prepared in example IV.C., 2.1 g. mineral spirits and 2.9 g. of a ketimine blocked polyamine prepared by reacting 1 mole diethylenetriamine with 2 moles methyl isobutyl ketone, the secondary amine group of the polyamine being blocked by reacting 2 moles of the above product with 1 mole of dimeryl isocyanate. The dimeryl isocyanate had the theoretical structural formula $D(CH_2NCO)_2$ where D is the dimeric fat acid radical derived from the mixture of dimerized fat acids obtained from the fat acids in tall oil consisting mainly of a mixture of dimerized linoleic and oleic acids. Coatings were applied as in example V only to glass and tin plate which coatings had a Pencil hardness of 4B after 14 days and a G.E.. extensibility of >60 percent respectively.

EXAMPLE VIII

Example VII was repeated using a mixture of 9.5 g. diisocyanate as prepared in example IV.C., 45.5 g. ketimine blocked polyamine as used in example VII, 48.0 g. Titanox pigment RA–50 and 31.2 g. mineral spirits. Three-mil coatings of the mixture were applied to various substrates and the resulting coated substrates were exposed to an atmosphere containing 50 percent relative humidity (72° F.). The polymer was thus formed in situ on the substrate surfaces and the coatings became tack free after 16 hours. The coatings on glass after 7 days had a Pencil hardness of 4B and after 14 days had a Pencil hardness of 2B. The G.E. extensibility of the coating on tin plate was >60 percent. The gloss retention of the coating on granodized steel was very good after 500 hours in the carbon arc Weather-Ometer. Dry adhesion on glass, tin plate, black plate steel, polished cold-rolled steel, granodized steel, copper and aluminum was good, there being less than 40 percent loss of coating after 14 days (measured as in example V).

EXAMPLE IX

Example VIII was repeated using a mixture of 5.9 g. diisocyanate as prepared in example IV.C., 2.2 g. tetrakis(2-hydroxypropyl)ethylenediamine, and 3.5 g. Cellosolve acetate: xylene (2:5 volume ratio). The three mil coatings on the glass and tin plate substrates became tack free after 48 hours. The coating on glass after 14 days had a Pencil hardness of <6B and a Sward Rocker hardness of 49. The coating on tin plate had a G.E. extensibility of >60 percent.

EXAMPLE X

Example IX was repeated using 19.8 g. of the diisocyanate, 7.3 g. tetrakis(2-hydroxypropyl)-ethylenediamine, 3 drops stannous octoate and 11.7 g. of the Cellosolve acetate:xylene solvent. The coatings became tack free in 16 hours, had a Pencil hardness and Sward Rocker hardness after 14 days (on glass) of 5B and 20, respectively, and had a G.E. extensibility of >60 percent (on tin plate). Coatings on tin plate, granodized steel and copper had good adhesion after 14 days.

EXAMPLE XI

In a 500-mil resin flask fitted with an air-driven stirrer, nitrogen purge inlet and outlet, thermocouple and addition funnel were placed 10.75 g. (0.25 equivalent) piperazine and 75 ml. dry xylene. A solution of 47.75 g. (0.25 equivalent) diisocyanate as prepared in example IV.C. in 30-mil dry xylene was then added over a 5-minute period. The reaction temperature was gradually raised to 200° C. during which time most of the xylene distilled off. The mixture was then held under vacuum for 1 hour to remove residual xylene. The resulting polyurea polymer was removed from the reaction flask and molded in a Pasadena press at 390° F. to form a 0.050-inch thick sheet. The polyurea polymer had a Ball and Ring melting point of 172°–5° C. The molded sheet had a yield point of 7,400 p.s.i. and an ultimate tensile strength of 5,440 p.s.i. at an elongation of 100 percent as measured on an Instron Tensile Testing Instrument, Type TT-C.

EXAMPLE XII

Example XI was repeated using 21.5 g. piperazine, 19.1 g. diisocyanate as used in example XI, 120 g. dimeryl diisocyanate as used in the preparation of the blocked ketimine described in example VII and a total of 150 ml. dry xylene solvent. The resulting polyurea polymer had a Ball and Ring melting point of 115°–116° C., a Shore "A" hardness of 95–98 and an inherent viscosity of 0.55 as measured on a 0.5 percent by weight solution of the polymer in m-cresol. The molded sheet had the following properties as measured on the Instron Tensile Testing Instrument, Type TT-C:

| Specimen Temp. °C. | Ultimate Tensile Strength--p.s.i. | Tensile Elongation % | Modulus p.s.i. |
|---|---|---|---|
| 25 | 5,770 | 250 | 35,300 |
| 77 | 2,760 | 443 | — — |
| −25 | 7,270 tg 102 | | — — |
| −46 | 8,600 | 61 | — — |

The above examples show that the polymers of the present invention are highly useful as coatings for a variety of substrates and can also be used to form moldings which are strong and flexible.

It is to be understood that changes and variations may be made without departing from the spirit and scope of the invention as defined in the appended claims.

The embodiments of the invention in which an exclusive property or privilege is claimed are defined as follows:

1. A diisocyanate of the formula
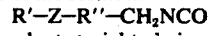
where R′ is a monovalent straight chain saturated or ethylenically unsaturated aliphatic hydrocarbon radical containing 2 to 6 carbon atoms, R″ is a divalent straight chain saturated or ethylenically unsaturated aliphatic hydrocarbon radical containing 7 to 11 carbon atoms, the sum of the carbon atoms is R′ and R″ is 13, and Z is a divalent radical of the structure.

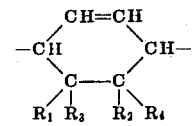

or

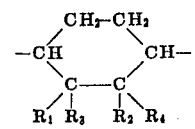

where $R_1$ and $R_2$ are H or $CH_3$ with the proviso that one of such radicals must be H and $R_3$ and $R_4$ are H or $CH_2NCO$ with the proviso that one of such radicals must be H and the other must be $CH_2NCO$.

2. A diisocyanate according to claim 1 wherein Z is

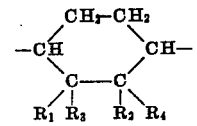

3. A diisocyanate according to claim 2 wherein R′ is $CH_3(CH_2)B3$—and R″ is —$CH=CH(CH_2)_7$—.

4. A diisocyanate according to claim 2 wherein R′ is $CH_3(CH_2)B4$—and R″ is —$(CH_2)_8$—.

5. A diisocyanate according to claim 2 wherein R′ is $CH_3(CH_2)B5$—and R″ is —$(CH_2)_7$—.

6. A diisocyanate according to claim 1 wherein Z is

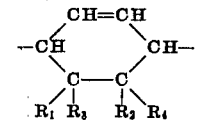

7. A diisocyanate according to claim 6 wherein R′ is $CH_3(CH_2)B3$—and R″ is —$(CH_2)_9$—.

8. A diisocyanate according to claim 6 wherein R′ is $CH_3(CH_2)B4$—and R″ is —$(CH_2)_8$—.

9. A diisocyanate according to claim 6 wherein R′ is $CH_3(CH_2)B5$—and R″ is —$(CH_2)_7$—.

* * * * *

PO-1050
(5/69)

UNITED STATES PATENT OFFICE
CERTIFICATE OF CORRECTION

Patent No. 3,624,122                    Dated    Nov. 30, 1971

Inventor(s)    Marwan R. Kamal, John R. Nazy, Donald H. Wheeler

It is certified that error appears in the above-identified patent and that said Letters Patent are hereby corrected as shown below:

Column 2, line 27, after "EXAMPLE", insert -- I --. Column 2, lines 54 and 75; col. 3, line 37; col. 4, lines 25 and 47; col. 5, lines 32 and 47; col. 6, line 23; "n25D" should read --$n_D^{25}$--. Column 3, line 38, "n30D" should read --$n_D^{30}$--. Column 5, line 50, "8.5 percent" should read --8.54 percent--. Column 6, line 28, "was" should read --as--; line 40, --<0.4-- should be inserted across from "amine number"; line 72, after "diazoamino, insert --hydrazino--. Column 7, line 64, "suitably" should read --suitable--. Column 10, line 61, "preferable" should read --preferably--. Column 12, line 71, "coatings" (second occurrence) should read --coating--. Column 13, line 33, "30-mil" should read --30 ml.--; line 66, "7.270tg102" should read --7.270-- and "102" should be inserted in 3rd column of the table, between "443" and "61". Column 14, lines 38-43, in the top line of the formula, "$\begin{smallmatrix} & CH_2 - CH_2 & \\ -CH & & CH- \end{smallmatrix}$" should read --$\begin{smallmatrix} & CH = CH & \\ -CH & & CH- \end{smallmatrix}$--;

line 46, "$CH_3(CH_2)B3-$" should read -- $CH_3(CH_2)_3-$ --; line 48, "$CH_3(CH_2)B4-$" should read -- $CH_3(CH_2)_4-$ --; line 50, "$CH_3(CH_2)B5-$" should read -- $CH_3(CH_2)_5-$ --; lines 53-57, in the top line of the formula, "$\begin{smallmatrix} & CH = CH & \\ -CH & & CH- \end{smallmatrix}$" should read --$\begin{smallmatrix} & CH_2 - CH_2 & \\ -CH & & CH- \end{smallmatrix}$--;

line 62, "$CH_3(CH_2)B3-$" should read --$CH_3(CH_2)_3-$ --; line 64, "$CH_3(CH_2)B4-$" should read --$CH_3(CH_2)_4-$ --; line 66, "$CH_3(CH_2)B5-$" should read --$CH_3(CH_2)_5-$ --.

Signed and sealed this 13th day of February 1973.

(SEAL)
Attest:

EDWARD M. FLETCHER, JR.
Attesting Officer

ROBERT GOTTSCHALK
Commissioner of Patents